(12) United States Patent
Onut et al.

(10) Patent No.: US 12,348,562 B2
(45) Date of Patent: *Jul. 1, 2025

(54) DETECTION OF CONTENT GENERATED FROM PHISHING ATTACKS

(71) Applicant: CrowdStrike, Inc., Sunnyvale, CA (US)

(72) Inventors: Iosif Onut, Ottawa (CA); Qian Cui, Ottawa (CA); Guy-Vincent Jourdan, Ottawa (CA)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/496,568

(22) Filed: Oct. 27, 2023

(65) Prior Publication Data
US 2024/0056480 A1    Feb. 15, 2024

Related U.S. Application Data

(63) Continuation of application No. 17/694,132, filed on Mar. 14, 2022, now Pat. No. 11,818,170, which is a (Continued)

(51) Int. Cl.
*H04L 9/40* (2022.01)
*G06N 20/00* (2019.01)

(52) U.S. Cl.
CPC ......... *H04L 63/1483* (2013.01); *G06N 20/00* (2019.01); *H04L 63/1416* (2013.01)

(58) Field of Classification Search
CPC ............. H04L 63/1483; H04L 63/1416; H04L 63/1425; G06N 20/00
See application file for complete search history.

(56) References Cited

U.S. PATENT DOCUMENTS 7,756,535 B1   7/2010 Diao et al.
8,695,100 B1   4/2014 Cosoi
(Continued)

FOREIGN PATENT DOCUMENTS

CN   108111478 A   6/2018
CN   108259415 A   7/2018
(Continued)

OTHER PUBLICATIONS

A. Al-Bataineh and G. White, "Analysis and detection of malicious data exfiltration in web traffic," 2012 7th International Conference on Malicious and Unwanted Software, Fajardo, PR, USA, 2012, pp. 26-31, doi: 10.1109/MALWARE.2012.6461004. (Year: 2012).
(Continued)

*Primary Examiner* — Robert B Leung
(74) *Attorney, Agent, or Firm* — Womble Bond Dickinson (US) LLP

(57) ABSTRACT

Mechanisms are provided to detect content generated from phishing attacks. The mechanisms process an electronic communication, received from a data network, to produce a structure token. The structure token represents a content structure of the electronic communication. The structure token is processed by a machine learning model, which is trained to identify content that is generated in response to one or more phishing attacks. The machine learning model produces a classification output that indicates whether the electronic communication includes content that was generated in response to the one or more phishing attacks.

17 Claims, 5 Drawing Sheets

Related U.S. Application Data continuation of application No. 16/411,272, filed on May 14, 2019, now Pat. No. 11,303,674.

(56) References Cited

U.S. PATENT DOCUMENTS

| | | | |
|---|---|---|---|
| 8,839,369 | B1 | 9/2014 | Dai et al. |
| 9,092,306 | B1* | 7/2015 | Su .................... H04W 12/10 |
| 9,325,730 | B2 | 4/2016 | Higbee et al. |
| 11,057,410 | B1* | 7/2021 | Myers .................. H04L 43/065 |
| 2009/0077383 | A1 | 3/2009 | de Monseignat et al. |
| 2009/0094240 | A1* | 4/2009 | Bordeaux ............ G06Q 10/107 |
| 2009/0228565 | A1* | 9/2009 | Kalyan ................. H04L 51/212 709/206 |
| 2012/0210388 | A1* | 8/2012 | Kolishchak ........... G06F 21/552 726/1 |
| 2012/0254333 | A1 | 10/2012 | Chandramouli et al. |
| 2014/0033307 | A1 | 1/2014 | Schmidtler |
| 2015/0067833 | A1 | 3/2015 | Verma et al. |
| 2016/0014151 | A1* | 1/2016 | Prakash .................. H04L 47/62 726/22 |
| 2016/0323243 | A1* | 11/2016 | LeVasseur ............. G06N 20/00 |
| 2016/0344770 | A1 | 11/2016 | Verma et al. |
| 2017/0185799 | A1* | 6/2017 | Zheng ................. G06F 16/9535 |
| 2017/0244736 | A1 | 8/2017 | Benishti |
| 2018/0027014 | A1* | 1/2018 | Irimie ................ G06Q 10/0639 726/22 |
| 2018/0115565 | A1 | 4/2018 | Kuo et al. |
| 2018/0278627 | A1 | 9/2018 | Goutal |
| 2019/0149574 | A1 | 5/2019 | Thomas et al. |
| 2020/0366712 | A1 | 11/2020 | Onut et al. |

FOREIGN PATENT DOCUMENTS

| | | |
|---|---|---|
| CN | 108965245 A | 12/2018 |
| CN | 109101552 A | 12/2018 |
| WO | 2013/009713 A2 | 1/2013 |
| WO | 2017/049042 A1 | 3/2017 |

OTHER PUBLICATIONS

F. Ullah et al. "Data exfiltration: A review of external attack vectors and countermeasures," Journal of Network and Computer Applications. Jan. 1, 2018; 101; 18-54. (Year: 2018).

Chandrasekaran, M., Narayanan, K. and Upadhyaya, S., Jun. 2006, Phishing email detection based on structural properties. In NYS cyber security conference (vol. 3, pp. 2-8). (Year: 2006).

Smadi, S., Aslam, N. and Zhang, L., 2018. Detection of online phishing email using dynamic evolving neural network based on reinforcement learning. Decision Support Systems, 107, pp. 88-102. (Year: 2018).

Sentürk, S., Yerli, E. and Sogukpinar, I., Oct. 2017, Email phishing detection and prevention by using data mining techniques. In 2017 International Conference on Computer Science and Engineering (UBMK) (pp. 707-712). IEEE. (Year: 2017).

Examination Report under 18(3) dated Sep. 30, 2022 for Application No. GB2117971.8, 6 pages.

International Search Report and Written Opinion dated Aug. 10, 2020 for International Application No. PCT/IB2020/054531, 11 pages.

List of IBM Patents or Patent Applications Treated as Related, Mar. 14, 2022, 2 pages.

"Entropy (information theory)", Wikipedia, last edited Apr. 2, 2019, 16 pages.

"Sigmoid function", Wikipedia, last modified Feb. 22, 2019, 5 pages.

Bhowmick, Alexy et al., "Machine Learning for E-mail Spam Filtering: Review, Techniques and Trends", arXiv:1606.01042v1 [cs.LG] Jun. 3, 2016, 27 pages.

Cova, Marco et al., "There is No Free Phish: An Analysis of "Free" and Live Phishing Kits", 2nd USENIX Workshop on Offensive Technologies (WOOT 8), Jul. 28-Aug. 1, 2008, 8 pages.

Godoy, Daniel, "Understanding binary cross-entropy/log loss: a visual explanation", Towards Data Science, Nov. 21, 2018, 11 pages.

Goldberg, Andrew, "How Companies Are Detecting Spear Phishing Attacks Using Machine Learning", Business.com, May 21, 2018, 7 pages.

Hochreiter, Sepp et al., "Long Short-Term Memory", Neural Computation 9(8): 1735-1780, Nov. 15, 1997, 32 pages.

Mccalley, Heather et al., "Analysis of Back-Doored Phishing Kits", 7th Digital Forensics (DF), Jan. 2011, pp. 155-168 (accessed from HAL archives, HAL Id: hal-01569548, submitted on Jul. 27, 2017, 15 pages).

Moradpoor, Naghmeh et al., "Employing Machine Learning Techniques for Detection and Classification of Phishing Emails", 2017 Computing Conference, London, UK, doi: 10.1109SAI.2017. 8252096, pp. 149-156, Jul. 2017.

Nguyen, Minh et al., "A Deep Learning Model with Hierarchical LSTMs and Supervised Attention for Anti-Phishing", arXiv preprint arXiv: 1805.01554, pp. 1-8, May 2018.

Ravi, Vinayakumar et al., "DeepAnti-Phish Net: Applying Deep Neural Networks for Phishing Email Detection", 1st AntiPhishing Shared Pilot at 4th ACM International Workshop on Security and Privacy Analytics, IWSPA 2018, pp. 1-11, Mar. 2018.

Schuster, Mike et al., "Bidirectional Recurrent Neural Networks", IEEE Transactions on Signal Processing, vol. 45, No. 11, Nov. 1997, pp. 2673-2681.

Sundermeyer, Martin et al., "LSTM Neural Networks for Language Modeling", Thirteenth Annual Conference of the International Speech Communication Association, Sep. 9-13, 2012, 4 pages.

Toolan, Fergus et al., "Feature Selection for Spam and Phishing Detection", 2010 eCrime Researchers Summit, doi:10.1109ecrime. 2010.5706696, pp. 1-12, Jun. 2010.

Verma, Rakesh et al., "Detecting Phishing Emails the Natural Language Way", In European Symposium on Research in Computer Security, LNCS 7459, pp. 824-841, Sep. 2012.

IBM; Chinese Office Action dated Nov. 1, 2022, from related Chinese Application No. 202080034464.8 (5 pages). [English Translation included.].

* cited by examiner

CALENDAR ENTRY: APPOINTMENT

DESCRIPTION: CLEVELAND CLIFS MTG/BOB SMITH 4180

DATE: 7/19/2000

TIME: 1:00 PM – 4:30 PM (CENTRAL STANDARD TIME)

CHAIRPERSON: OUTLOOK MIGRATION TEAM

DETAILED DESCRIPTION:

...

DETECTION OF CONTENT GENERATED FROM PHISHING ATTACKS

CROSS-REFERENCE TO RELATED APPLICATIONS

This application is a continuation of U.S. application Ser. No. 17/694,132, filed on Mar. 14, 2022, which is a continuation of U.S. application Ser. No. 16/411,272, filed on May 14, 2019, now U.S. Pat. No. 11,303,674, all of which are incorporated herein by reference in their entirety.

BACKGROUND

The present application relates generally to an improved data processing apparatus and method and more specifically to mechanisms for detecting phishing electronic communication campaigns based on deep learning network detection of phishing exfiltration communications.

Phishing attacks continue to represent a major threat for individuals and enterprises. A phishing attack involves an often cleverly crafted electronic communication sent to a recipient in which the content of the communication fraudulently attempts to obtain sensitive information from the recipient, e.g., usernames, passwords, credit card information, etc., by disguising the source of the phishing electronic communication as a trustworthy entity. Typically carried out by electronic mail spoofing or instant messaging, phishing attacks often direct users to enter personal information at a fake website, the look and feel of which are identical or at least very similar to the legitimate website.

Various solutions exist for detecting potential phishing attacks, with these solutions generally being classifiable as either blacklisting solutions, website comparison solutions, and spam communication filtering solutions. With blacklisting solutions, Uniform Resource Locators (URLs) and domain names of known phishing attacks are included in a blacklist data structure used by filtering programs to filter out communications coming from those domain names or known URLs. Blacklist solutions rely on a list of domain names/URLs that are discovered and reported by third parties in order for the domain names/URLs to be added to the blacklist data structure and pushed to clients for implementation in their filtering programs.

Website comparison solutions rely on comparisons of the content of a suspicious website with either the legal website or other known phishing websites to determine similarities or discrepancies that may indicate whether or not the suspicious website is a phishing website or not. Comparing the suspicious website to a legal website attempts to determine if the suspicious website is similar to legal websites such that the suspicious website should be considered legal as well. This solution requires a large number of legal websites in order to perform the comparison and provide a reasonably accurate determination. Comparing the suspicious website to phishing web sites is based on the observation that many phishing websites are created based on other phishing websites and thus, similarities with other phishing websites is indicative of the suspicious website being a phishing website. This solution can provide good results, but is computationally intensive as it requires maintaining a database of current phishing attacks and to compare each suspicious website to all these attacks.

Spam communication filtering solutions look at text in the phishing communication content and compare the content against rules to determine whether the communication is a phishing communication (spam) or not. Such spam communication filtering solutions are difficult to implement in that phishing entities or spammers create their communications in a manner that will be different for every phishing or spam campaign and for each targeted entity in hopes that the recipient will select a malicious link. Thus, one must continuously generate new rules to address the changing situation with the phishing/spam communications.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising a processor and a memory, the memory comprising instructions executed by the processor to configure the processor to implement a phishing exfiltration communication identification (PECI) system that operates to detect phishing exfiltration communications. The method comprises receiving, by the PECI system, an input electronic communication from a data network, and processing, by a preprocessor of the PECI system, the input electronic communication to extract a structure token. The structure token represents the content structure of the input electronic communication. The method further comprises inputting, by the PECI system, the structure token into a machine learning model of the PECI system that is trained, through a machine learning training operation, to identify phishing exfiltration communication grammars, and relationships between phishing exfiltration communication grammars, in structure tokens that are input to the machine learning model. Moreover, the method comprises processing, by the machine learning model, the structure token to generate at least one first vector output indicating computed values for processing by classification logic of the PECI system. In addition, the method comprises processing, by the classification logic, the at least one first vector output from the machine learning model, to classify the input electronic communication as either a phishing exfiltration communication or a non-phishing exfiltration communication. Furthermore, the method comprises outputting, by the classification logic, a classification output indicating the classification of the input electronic communication.

In some illustrative embodiments, the method further comprises intercepting, by the PECI system, the input electronic communication in response to an attempt to transmit the input electronic communication from a first computing device associated with a phishing website, through which personal information about one or more targeted entities is collected, and a second computing device associated with a personal information collection point that collects the personal information from the one or more targeted entities. By identifying phishing exfiltration communications, rather than evaluating the initial phishing communications sent to targeted entities or the websites used for performing phishing, the mechanisms of such illustrative embodiments of the present invention do not require a priori knowledge of the phishing communications sent by attackers or the websites that are used by the attackers and can identify any communications from any sources used to exfiltrate or harvest personal information and provide it to a collection point computing system or collection point account, e.g., an attacker's alternate email address.

In some illustrative embodiments, the method further comprises processing, by the PECI system, the input electronic communication to extract one or more content feature metrics. In some illustrative embodiments, the content feature metric(s) comprise statistical measures of content of the input electronic communication that assist in distinguishing false positives or false negatives in the classification output. In some illustrative embodiments, the one or more content feature metrics comprise at least one of a content entropy metric that is a measure of uncertainty of content of the input electronic communication, where the entropy increases as a variety of symbols used in the content of the input electronic communication increases, or a text proportion metric that is a measure of a proportion of at least one first type of characters in the content of the input electronic communication to at least one second type of characters in the content of the input electronic communication. The use of the content feature metrics improves the accuracy of the classification of the input electronic communication generated by the PECI system by reducing false positives and false negatives.

In some illustrative embodiments, the method further comprises inputting, by the machine learning model, the at least one first vector output to concatenation logic of the PECI system, inputting, by the PECI system, the one or more content feature metrics to the concatenation logic, and concatenating, by the concatenation logic, the at least one first vector output with the one or more content feature metrics to generate a second output vector that is input to the classification logic. In such embodiments, the classification logic processes the at least one first vector output from the machine learning model to classify the input electronic communication as either a phishing exfiltration communication or a non-phishing exfiltration communication at least by processing the second output vector comprising the at least one first vector output concatenated with the one or more content feature metrics. This concatenated vector provides an input to the classification logic that indicates not only the results of the processing by the machine learning model, but also the content features which improve the classification performed by the classification logic.

In some illustrative embodiments, the structure token is a string of characters where each character in the structure token is either a class designator, from a set of class designators, indicating a classification of a type of content present in a corresponding portion of text of the input electronic communication, or a numeric value indicating a number of characters in the content of the input electronic communication corresponding to a previous class designator in the string of characters of the structure token. In some illustrative embodiments, the set of class designators comprise a first class designator indicating an alphabetical character in the content of the input electronic communication, a second class designator indicating a numerical character in the content of the input electronic communication, a third class designator indicating a formatting character string in the content or coding of the input electronic communication, and a fourth class designator indicating characters not belonging to any of the first, second, or third classes. The structure token provides a concise and compact representation of the structure of the input electronic communication that can be more easily processed by the machine learning model so as to identify patterns of phishing exfiltration communication grammars in the input electronic communication.

In some illustrative embodiments, the machine learning model is a bidirectional Long Short Term Memory (LSTM) based Recurrent Neural Network (RNN), and the at least one first vector output comprises one first vector output corresponding to a forward propagation set of LSTM cells and a second first vector output corresponds to a reverse propagation set of LSTM cells in the bidirectional LSTM based RNN. The bidirectional LSTM based RNN ensures proper identification of phishing exfiltration communication grammars since such grammars will be properly classified in both directions of the LSTM based RNN while portions of the input electronic communication that do not correspond to phishing exfiltration communication grammars will not be classified as phishing exfiltration communication grammars in both directions. This is especially useful in situations where users are aware of the phishing attack and purposefully enter misleading information to thwart the attackers.

In some illustrative embodiments, outputting the classification output indicating the classification of the input electronic communication comprises outputting the classification output to a responsive action computing system and automatically performing, by the responsive action computing system, a responsive action in response to the classification output indicating the classification of the input electronic communication to be a phishing exfiltration communication. In some illustrative embodiments, the responsive action comprises at least one of sending a notification to a computing device associated with an authorized user, wherein the notification indicates an identification of the input electronic communication as a phishing exfiltration communication, automatically blocking the input electronic communication from reaching a destination of the input electronic communication, redirecting the input electronic communication to a different destination than a destination of the input electronic communication, or automatically reporting a source of the input electronic communication to an authority for suspension of a capability of the source to send electronic communications. In this way, the ability of the phishing attack to be successful in acquiring personal information of targeted entities is minimized.

In some illustrative embodiments, the data processing system comprises an electronic mail service provider server computing system, and the input electronic communication is an input electronic mail communication routed through the electronic mail service provider server computing system. In this way, email service providers may thwart phishing attacks on the backend of communications by the phishing website to the collection point computing system or collection point email address, effectively blocking the attacker's ability to benefit from the phishing attack.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
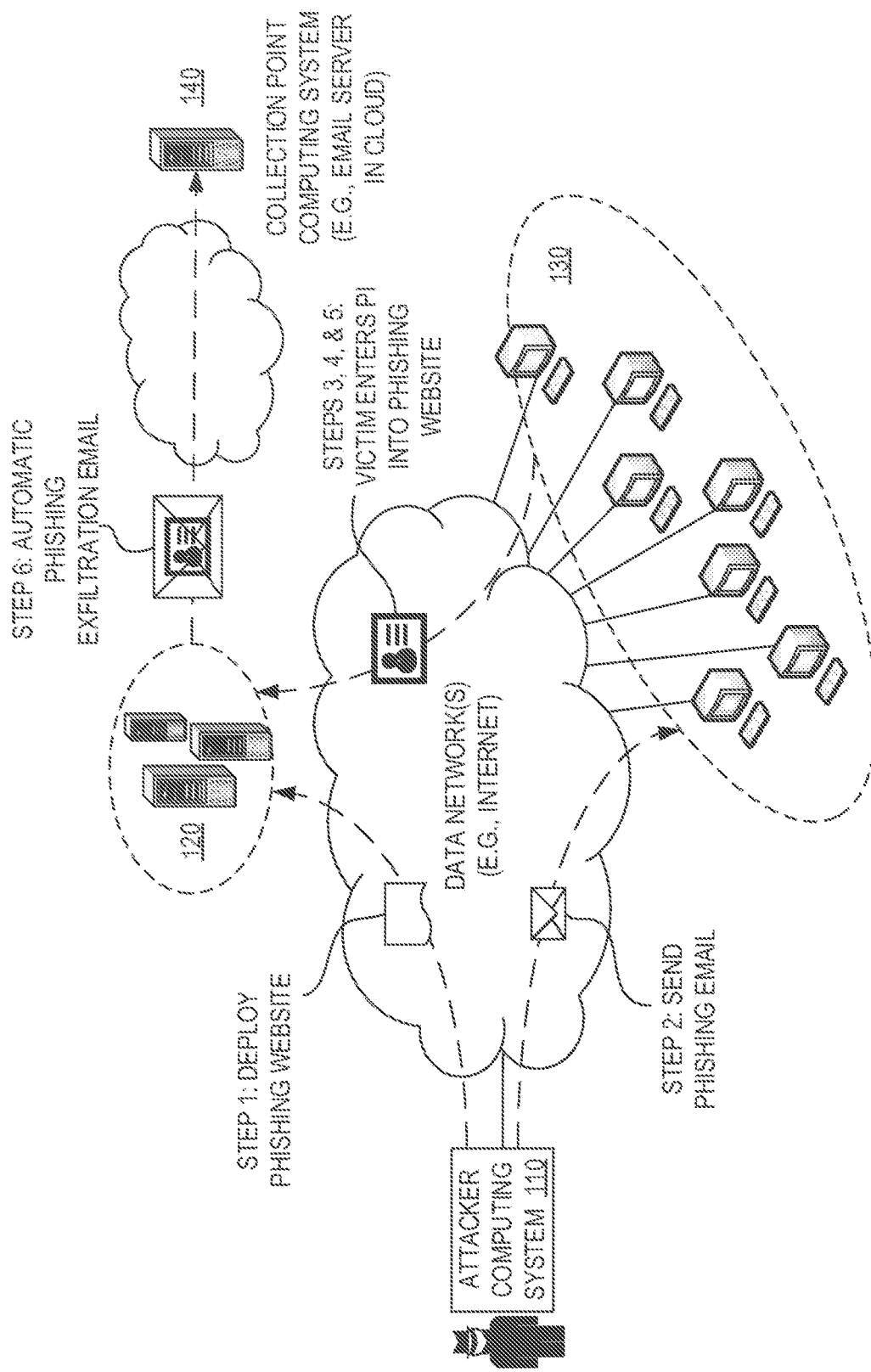
FIG. 1 is an example diagram depicting a block diagram of the anatomy of a phishing attack.

As noted above, existing solutions for identifying phishing attacks focus on the phishing communications sent to the targeted entities themselves, or a comparison of the phishing website to other known phishing websites or known safe websites. Rather than evaluating the original phishing communications themselves, or comparing the phishing website to other known websites, the present invention provides an improved computer tool that operates on the phishing exfiltration communications that are the backend communications used by the phishing website to transmit the collected personal information (PI) to a collection computing system which collects the PI entered by the various target entities that fall victim to the phishing attack. These backend communications are referred to herein as phishing exfiltration or harvesting communications.

These exfiltration/harvesting communications may be electronic mail communications in which the PI is inserted and sent to another electronic communications account, e.g., another electronic mail address, hosted by another computing device or to which the electronic mail communications are directed for collection of the PI. For the phishing entity to be able to extract the PI from the exfiltration/harvesting communications (hereafter referred to as "exfiltration" communications), the exfiltration communications need to be in a format that is understood by a script executed at the collection computing device because the phishing entity will not manually copy and paste PI information from these exfiltration communications due to the large number of exfiltration communications, e.g., on the order of hundreds or thousands for a typical phishing campaign. As a result, exfiltration communications will have an associated grammar which can be exploited by the mechanisms of the illustrative embodiments to identify phishing exfiltration communications.

The improved computing tool of the illustrative embodiments applies machine learning models, artificial intelligence, and data mining computing tools to electronic communications, e.g., electronic mail communications, to determine whether or not the electronic communications are phishing exfiltration communications. In some illustrative embodiments, a recurrent neural network (RNN), such as a bi-directional Long-Short Term Memory (LSTM) RNN in some implementations, is adapted to detect the presence of phishing exfiltration communication grammars in electronic communications and identify electronic communications that represent phishing exfiltration communications. While a bi-directional LSTM RNN will be used in the description of the illustrative embodiments herein, the present invention is not limited to such and any neural network or machine learning model, such as a decision tree model, Random Forest model, SVM, or the like, may be trained and used in accordance with the illustrative embodiments. In response to a phishing exfiltration communication being detected, appropriate protection actions and/or notifications may then be automatically performed/transmitted to minimize the ability of the phishing entity to be able to collect PI from the targeted entities. In some cases, phishing entity accounts may be frozen or blocked, URL/website access may be blocked, notifications may be sent to compromised computing systems, communication service providers, etc., to prevent phishing entities from accessing PI submitted to the phishing websites and to disincentivize continue execution of the phishing campaign.

By targeting detection of phishing campaigns on the backend communications between the phishing website and the collection point of the PI, the mechanisms of the illustrative embodiments provide a means to detect the presence of a phishing attack on a network without having to first be made aware of the phishing URL or the initial phishing communication sent to the intended victims. The attack is detected through the network activity it generates, as soon as this activity starts. This is different from known mechanisms which require such information in order to operate. The present invention also provide a mechanism for communication service providers, e.g., email service providers, to detect when a user of their service is using their service for phishing exfiltration so that they can take appropriate action to deny the user use of their service for such purposes.

The mechanisms of the illustrative embodiments may be implemented in a variety of different computing systems depending on the desired implementation. For example, the phishing exfiltration communication identification (PECI) engine may be implemented in potential target entity computing systems, e.g., a company's, individual's or other entity's computing system that may be a target of a phishing attack. In other illustrative embodiments, the PECI engine may be implemented in an intrusion detection system/intrusion prevention system (IDS/IPS) environment, e.g., in computing systems specifically configured to detect and prevent intrusions on other computing systems (this implementation provides a low impact on performance and maximum visibility). In some illustrative embodiments, the mechanisms of the illustrative embodiments may be implemented in communication system servers computing systems such that the mechanisms of the illustrative embodiments may be applied to all communications flowing through the communication system server computing system, e.g., in one or more electronic mail server computing systems hosting electronic mail accounts. The mechanisms of the illustrative embodiments may be implemented in large scale electronic mail communication service providers' server computing systems to monitor and identify phishing communications.

In one illustrative embodiment, the PECI engine comprises a preprocessor that extracts a structure token and content features from an input electronic communication. The structure token is a symbolic representation of how content is organized in the input electronic communication. This symbolic representation may comprise a sequence of characters and numerical values that represent the content of the electronic communication, where the characters may designate categories of content and the numerical values may represent numbers of textual characters in the content of the electronic communication that are associated with that category. The content features are features of the input electronic communication that help to distinguish actual phishing exfiltration communications from non-phishing exfiltration communications. For example, in one illustrative embodiment, the content features comprise content entropy and text proportion, which will be described in greater detail hereafter.

The PECI engine further comprises a first machine learning model, such as a RNN, into which the structure token is input from the preprocessor. The RNN is trained to recognize particular phishing exfiltration grammars present in structure tokens. The RNN operates on the structure token and outputs values computed by the RNN which are used by a binary classifier as input to decision logic of the binary classifier for generating a final output representing a verdict as to whether the input communication is a phishing exfiltration communication or not. In some illustrative embodiments, the RNN is a bi-directional LSTM based RNN which outputs an output vector (referred to as LSTM_output vector) comprising 256 dimensions (vector slots) and a second 256 dimension vector output for the reverse LSTM prediction (due to the bi-directional configuration) which is referred to as the LSTM_reverse_output vector. It should be appreciated that any number of dimensions may be used without departing from the spirit and scope of the present invention and the invention is not limited to bi-directional LSTM based RNN implementations but may use any suitable RNN implementation.

The output(s) of the RNN are provided along with the content features extracted by the preprocessor to concatenation logic of the PECI engine that concatenates the vectors into a single vector output. In one illustrative embodiment, this single vector output is a 514 dimension vector since it combines the 256 dimension vector output of the RNN, i.e. LSTM_output, and the 256 dimension vector output for the reverse LSTM prediction, i.e. LSTM_reverse_output, as well as an additional dimension for the content entropy content feature and an additional dimension for the text proportion content feature.

This single vector output from the concatenation logic is input to the binary classification engine (or binary classifier) of the PECI engine that generates a final prediction of whether or not the input electronic communication is a phishing exfiltration communication. The binary classifier may be implemented as a second machine learning model, such as a neural network, decision tree, Random Forest model, Bayesian model, SVM, or the like, which is trained to output a probability value based on the single vector input from the concatenation logic. The output of the binary classifier is the probability value indicating a probability that the input electronic communication is a phishing exfiltration communication. This probability may be provided to an appropriate responsive action engine for use in determining a responsive action based on the probability that the electronic communication is a phishing exfiltration communication. For example, the probability may be compared to a threshold probability value to determine if a responsive action should be performed. If the probability output from the binary classification engine is equal to or above the threshold probability value, then a responsive action may be performed. If the probability output from the binary classification engine is not equal to or above the threshold probability value, then no responsive action need be performed on this electronic communication.

Thus, the mechanisms of the illustrative embodiments provide a machine learning and artificial intelligence approach to identifying phishing exfiltration communications so that a responsive action can be performed to prevent the attacker from acquiring personal information of targeted entities. The machine learning approach of the illustrative embodiments has been found to achieve a high degree of accuracy, e.g., 0.3% false negatives and 0.18% false positives. By implementing the mechanisms of the illustrative embodiments in communication service provider computing systems, phishing attacks and phishing campaigns may be minimized, thereby providing significant improvement in the security of individuals and organizations' personal information.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the present invention provides an improved automated computer tool for identifying phishing exfiltration communications and performing responsive actions to prevent phishing entities from obtaining access to personal information (PI) from targeted entities. The mechanisms of the present invention were devised based on the observation of the recognizable grammars in phishing exfiltration communications used by phishing campaigns to collect the personal information of targeted entities at a collection point computing device. Thus, in order to better understand the way in which the improved computing tool operates, reference is now made to FIG. 1 which depicts an example block diagram of the anatomy of a phishing attack.

The example anatomy of a phishing attack shown in FIG. 1 assumes that the phishing attack utilized electronic mail (email) communications, however the illustrative embodiments are applicable to any electronic communications which may be utilized to perform phishing in order to entice a targeted entity to click a hyperlink or otherwise access a phishing website on a compromised server and enter their PI into fields of a user interface or otherwise provide their PI as input to the phishing website. As shown in FIG. 1, the process of performing a phishing attack campaign starts with an attacker 110 deploying (step 1) the phishing website on a compromised server computing device 120. The attacker 110 then composes a phishing electronic mail communication which is then transmitted (step 2) to a large population of targeted entities 130. Steps 1 and 2 constitute a "preparation stage" of the phishing attack while the remaining steps described hereafter constitute the "attack stage."

The potential victims of the population of targeted entities 130 receive the phishing email communications and some of these potential victims may click on a hyperlink or otherwise redirect their computing devices to access the phishing website deployed at the compromised server 120 (step 3). The victim's computing device is then redirected to the phishing website (step 4) through which the victim enters their personal information (PI) (step 5). It should be noted that the phishing website is specifically designed by the attacker 110 to represent a real or true website of the entity that they claim to be, often emulating the logos and content of the true or real website. Thus, the victim believes that they are accessing an authentic website of the real entity when in fact they are accessing the phishing website and entering their PI into the phishing website, e.g., their user identifiers, passwords, account numbers, security identifiers such as personal identification numbers, or the like.

The PI entered by the victim via their accessing of the phishing website is used by the phishing website to automatically populate the content of a phishing exfiltration communication which is then transmitted (step 6) to a collection point computing system 140. The collection point computing system 140 may be another email server or end point computing device to which the collected PI for the various victims is collected for nefarious use by the attacker 110. The collection point computing system 140 may be an email server in the cloud, for example. This process of steps 3 through 6, i.e. the "attack stage," is repeated for each victim in the population 130 of the phishing campaign.

As noted previously, existing attempts to thwart phishing attacks focus on the initial phishing communications transmitted to the potential victim population 130 (in step 2) or comparing the phishing website (deployed in step 1 and present on the compromised server 120) with other known phishing websites or legitimate websites to determine whether the website is likely a phishing website or not. These known mechanisms attempt to protect the victims themselves by focusing the solutions on the initial communication sent to the victim and the website accessed by the victim. Prior to the present invention, no mechanisms operate on the phishing exfiltration communications, such as via a mechanism at the electronic communication service provider computing devices facilitating the electronic communications from the compromised server 120 or at the collection point computing systems via the server computing systems in the cloud 140. That is, the present invention focuses on the computing device, e.g., server(s) hosting the phishing attack, and on the collection point computing device hosting the collection account or address of the attacker. As such, the owner of the network, e.g., a cloud provider, any hosting company, or any entity large enough to have multiple servers running inside its network, is informed that the network hosts a phishing attack without having to scan and detect the initial attack communication targeting the victims or analyzing the phishing website directly.

As mentioned above, the improved computer tool of the illustrative embodiments operates based on the observation that phishing exfiltration communications have identifiable grammars in the coding/content of the phishing exfiltration communications. These grammars may be used to generate phishing exfiltration communications upon which machine learning models, such as the RNN and the binary classifier of the PECI engine, may be trained to identify the presence of a phishing exfiltration communication, i.e. identifying when the grammars are present in an input electronic communication in such a way that they represent a phishing exfiltration communication. This training of the RNN and binary classifier may be performed using phishing exfiltration communications generated based on these grammars as well as normal, i.e. non-phishing, communications such that the RNN and binary classifier are able to properly classify, i.e. generate correct probabilities indicating, the communications as phishing exfiltration communications or normal communications.

For example, in one illustrative embodiment, during a training operation of the machine learning models of the PECI engine, e.g., the RNN and binary classifier, a set of unique phishing exfiltration communication grammars may be generated based on analysis of known phishing exfiltration emails. These phishing exfiltration communication grammars may be used by a training set generation engine to generate a training set of phishing exfiltration communications, in which each email communication in the training set is either a phishing exfiltration communication complying with one of the phishing exfiltration communication grammars, or is a normal communication, i.e. a non-phishing communication. This training data set may comprise thousands of communications, a large proportion of which are normal communications while a smaller, yet significant portion, are phishing exfiltration communications. The training data set of communications may be used to both train and test the machine learning models by splitting the training data set into a subset of training communications and a subset of testing communications. The training subset is used to train the machine learning models, e.g., the RNN and binary classifier, of the PECI engine using a supervised machine learning process, while the testing subset is used to test the machine learning models once training is considered to have been completed.

The following are examples of three phishing exfiltration email grammars identified and used in the set of unique phishing exfiltration communication grammars of this illustrative embodiment. It should be appreciated that while only three examples are shown here, the set of unique phishing exfiltration communication grammars may be substantially larger, e.g., many hundreds or even thousands of grammars.

Email Example 1

```
"-----~~-=BeGiN=-~~-----
"
"Online ID: ".$_POST['Email']."
"
"Password: ".$_POST['Passw']."
"
"---------=IP Adress & Date=---------
"
"IP Address: ".$ip."
"
"Country: ".$country."
"
"Date: ". $date."
"
"-------~~-=CoPyMe =-~~-------
"
```

Email Example 2

```
"---------------||by UbiA||---------------
"
"Email Provider: ".$emailprovider."
"
"Emai: " . $_POST['Email'] . "
"
"Pass: " . $_POST['Passwd'] . "
"
"IP : " .$ip. "
"
"-----------------------IIIII--------------------
"
"City: {$ city}
"
"Region: {$ region}
"
"Country Name: {$ countryName}
"
```

```
"Country Code: {$ countryCode}
"
"---------------------~!~------------------------
"
```

Email Example 3

```
"~~~~~Mail Info~~~~~
"
"Username : ".$_POST['user']."
"
"Password : ".$_POST['password']."
"
"~~~~~The ViCtIm ~~~~~
"
"|Client IP: ".$ip."
"
"|
"Browser :".$ Agent."
"
"DateTime : ".$timedate."
"
"country : ".$country."
"
"~~~~~~~~ ArysAdFS~~~~~~~
```

Grammars such as these, which specify the structure of the content in the coding of the communication, are used by a training dataset generation engine to generate synthetic phishing exfiltration communications (e.g., emails). For example, the training dataset generation engine may utilize these phishing exfiltration communications as a basis for the structure of the training dataset communication and fill in the communication content with actual data obtained from various sources or dummy data generated by the training dataset generation engine, e.g., inserting content corresponding to date/time, host name, country, etc. Such generated phishing exfiltration communications may be combined with normal communications obtained from a known normal communications dataset, e.g., Enron Email Dataset, to generate the training dataset. It should be appreciated that a ground truth is maintained for these communications indicating whether the communication is a phishing exfiltration communication or a normal communication. The ground truth may be used to verify correct output of the machine learning model during the supervised machine learning process and adjust operational parameters of the machine learning model based on a determined loss or error in the output of the machine learning model.

Figure 2:
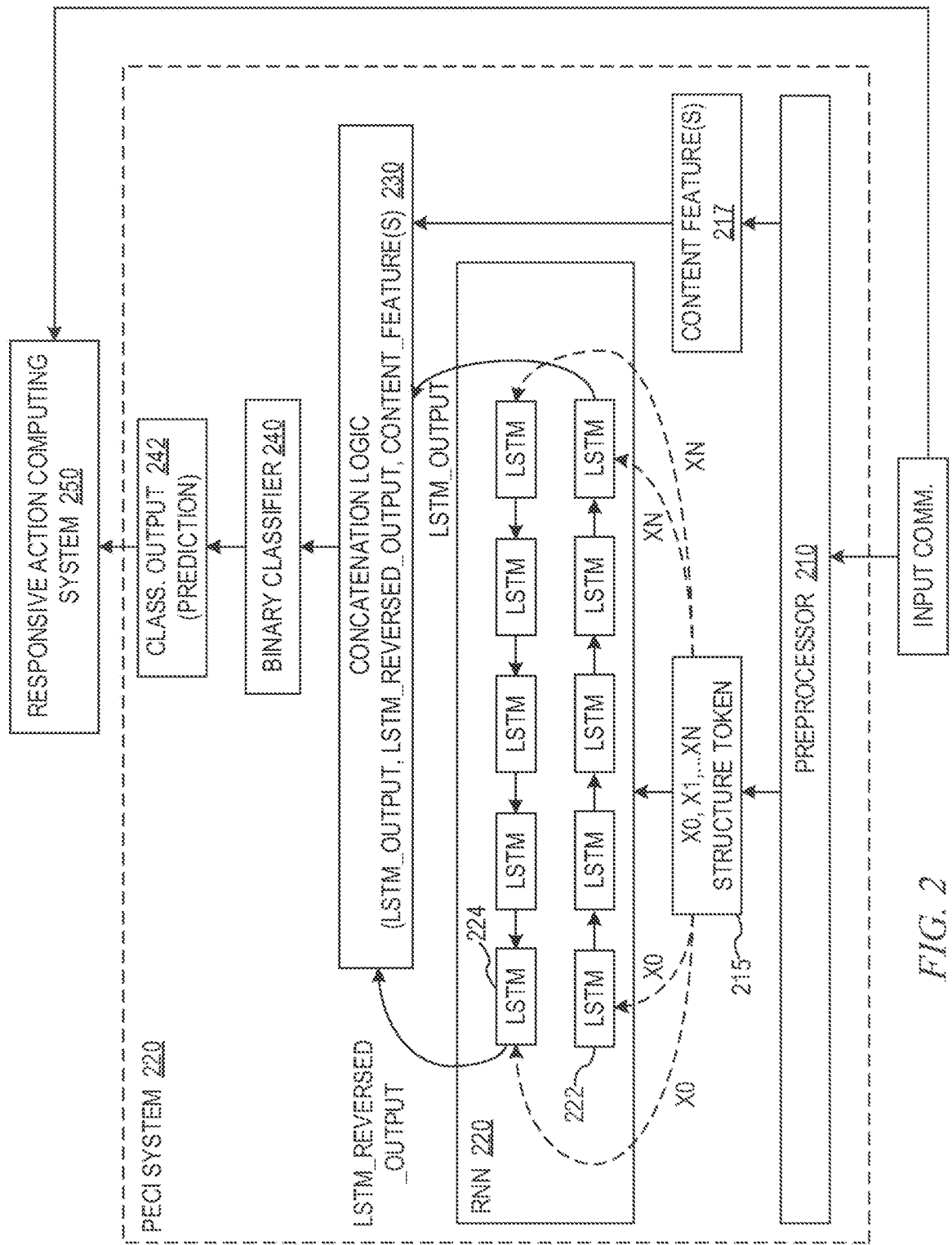
FIG. 2 is an example block diagram of a phishing exfiltration communication identification (PECI) system in accordance with one illustrative embodiment.

In order to understand the training and runtime operation of the PECI engine more clearly, the structure of the PECI engine in accordance with one illustrative embodiment, is depicted in FIG. 2. As shown in FIG. 2, the PECI engine 200 comprises a preprocessor 210, a first machine learning model 220, which in the depicted example is a bidirectional Long Short Term Memory (LSTM) recurrent neural network (RNN), concatenation logic 230, and a binary classification engine or binary classifier 240. In some illustrative embodiments, the first machine learning model 220 and the binary classifier 240 may together constitute a machine learning model that is trained as a whole through a machine learning operation to recognize phishing exfiltration grammars and relationships between phishing exfiltration grammars in structure tokens representing the structure of received input electronic communications, as described in greater detail hereafter. The PECI engine 200 may operate with, communicate with, or be integrated with a responsive action computing system 250 which may perform responsive actions in response to the detection of a phishing communication as discussed hereafter.

The PECI engine 200 receives an input communication, e.g., an input email, in the preprocessor 210 which operates on the input communication to extract a representation of the content of the input communication, considered to be an email, and one or more content feature metrics, where the one or more content feature metrics are used to reduce false positives that may be generated by the machine learning models. It should be appreciated that, in some illustrative embodiments, the content feature metrics may not be utilized, in which case the preprocessor 210 may only extract the content representation from the input email. The content features however are used to improve the performance of the PECI engine 200 in other illustrative embodiments, such as the one depicted in FIG. 2.

With regard to the content representation extracted by the preprocessor 210, the content representation is a representation of the structure of the content and thus, is referred to herein as a structure token. The structure token is generated based on the observation that the personal information (PI) present in phishing exfiltration emails is organized in specific patterns or grammars as noted above and that these patterns or grammars do not generally appear frequently in normal (non-phishing exfiltration) communications. This significant difference is the structure of the content of phishing exfiltration communications from normal communications gives an opportunity to detect phishing exfiltration communications using the determined structure of input communications.

The preprocessor 210 extracts the structure of the content of the input email as a structure token 215. The structure token 215 is a symbolic representation of how the content of the input email is organized, where the symbols represent categories of content and numerical count values are appended to the symbols to represent a number of characters in the content that correspond to the category. The sequence of pairings of symbol/numerical value constitutes the structure token. The symbols are class designators, from a predefined set of class designators, that indicate a classification of the type of content present in corresponding portions of content of the input communication, e.g., alphabetical characters, numerical characters, format designators, and the like.

For example, in one illustrative embodiment, the following four content categories are utilized:
- C: 26 letters of the English alphabet (a-z, A-Z)
- N: 10 digits (0-9)
- L: Line breaks (\n, \r)
- S: All other characters not belonging to the above categories.

In order to generate the structure token, the content of the input email is parsed by the preprocessor 210 to categories a next character in the content and increase a corresponding count until a next category of content is encountered as part of the parsing. Thus, the preprocessor 210 counts the consecutive characters in a category and appends the relevant count number or value after the category symbol. In order to build a compact structure token, a count value of "1" is skipped for the singleton character. For example, the text "Hi Yvonne/n This is John, please call me back." appearing in an email may be represented as a structure token as "C2SC6LSC4SC2SC4S2C6SC4SC4S". It should be noted that while only line break formatting character strings are considered as a separate category in this example, any formatting characters that may be present in the coding or content of an input communication may be recognized as a separate category when generating the structure token.

As further examples, consider the following examples of phishing exfiltration communication grammars and their corresponding structure tokens.

Email Example 4

Chase Bank Spam ReZult
User ID:
hostip
Full Name: fullname
City:
port:
State:
Mother Maiden Name:

This would produce the following structure token for our method:
C5SC4SC4SC6L2C4SC2S2LC6LC4SC4S4C8L2C4S2LC4LC5S2L2C6SC6SC4

Email Example 5

User ID:
Date of Birth:
Security Number:
IP Address:
HostName:

This would produce the following structure token for our method:
C4SC2S3LC4SC2SC5S3LC8SC6S3LC2SC7S3LC8S2L.

It should be appreciated that these are only examples of the content categories and subsequent structure tokens that may be generated and utilized in accordance with one illustrative embodiment. Other illustrative embodiments may utilize other content categories, in addition to or in replacement of those mentioned above, without departing from the spirit and scope of the illustrative embodiments. Moreover, a different encoding of the structure of the input communication may be utilized that does not require a sequence of content categories and numerical values indicating numbers of characters corresponding to the content categories. Any encoding that defines the structure of the input communication such that the encoded representation may be fed into a machine learning model such that the machine learning model may operate on the encoding to generate a prediction of whether or not the input communication is a phishing exfiltration communication may be used without departing from the spirit and scope of the present invention.

It should also be appreciated that during training/testing of the machine learning model 220, the structure token is generated by the preprocessor 210 for emails in the training/testing dataset, which may be the generated phishing exfiltration emails that have one or more of the phishing exfiltration communication grammars, or a normal email. In either case, the content of the email is converted to a structure token. In addition, in some illustrative embodiments, one or more content features are extracted by the preprocessor 210 from the content of the input email, as will be discussed in greater detail hereafter. In some illustrative embodiments, it can be appreciated that the content of the input communication may have an insufficient size to generate a structure token 215 of a required size. In such a case, fill data may be added to the input communication and/or structure token 215 to generate a structure token 215 of sufficient size. In other situations, the input communication may have a size in excess of what can be represented in the structure token, in which case the content may be truncated to fit the size of the structure token 215.

The structure token corresponding to the input email is provided as an input to the machine learning model 220, e.g., the bidirectional LSTM based RNN 220 in FIG. 2, as a set of inputs x0, x1, . . . xn, where each of the inputs to the machine learning model 220 is a corresponding portion of the structure token. For example, using the previous structure token for the email content ""Hi Yvonne/n This is John, please call me back", i.e. "C2SC6LSC4SC2SC4S2C6SC4SC2SC4S", the set of inputs will be x0=C, x1=2, x3=S, x4=C, x5=6, x6=L, x7=S etc. It should be appreciated that this one example of how the structure token may be partitioned for processing by the RNN 220 and other embodiments may utilize partitions or portions comprising two or more characters/numbers/symbols or any other designation of portions of the structure token to be processed via the RNN 220.

In the depicted example, a bidirectional LSTM based RNN is utilized. A RNN is a neural network where cells in the network are connected in a round-robin fashion and use the current output as the next input in each step of the RNN. RNNs are generally known in the art and are used for sequence inputs. The LSTM model is a type of RNN which has been proven to work well with complex patterns and long sequences. While LSTM based RNNs are generally known, they have not been configured or adapted for identifying phishing exfiltration communications in the manner of the present invention.

Moreover, a challenge in applying such LSTM based RNNs to the identification of phishing exfiltration communications is targeted entities, responding to such phishing campaigns may recognize the phishing attack and provide fake information or random data in an attempt to distract attackers. This fake information does not follow the structure of actual stolen PI because the fake information is random strings or long segments taken from other text. To overcome this issue, the machine learning model 220 implements the bidirectional LSTM architecture which uses a reversed copy of the input sequence. Having a bidirectional LSTM reinforces the recognition of the structure (e.g., the phishing exfiltration communication grammar) over the remainder of the message (the random strings), since that grammar is learned twice, forward and backward, while random strings are never learned nor recognized. Moreover, the encoding often helps in compressing the random data, since, for example, a string of 500 random characters is encoded into only 4 characters: "C500", thus decreasing the impact of the random characters.

In the depicted example implementation, the structure token 215 is input to the machine learning model 220 such that the first portion of the structure token 215 is input to a first LSTM cell 222 of a forward direction sequence of LSTM cells 222 and a last LSTM cell 224 of a reverse direction sequence of LSTM cells 222. The other portions are similarly input to LSTM cells of the forward and reverse direction sequences in accordance with the sequence of the structure token 215. For example, if the input structure token is "C2SC6L", the LSTM cells work 1 input at a time such that a first input x0 is "C", a second input x1 is "2", the third input x2 is "S", etc. In the example implementation then, each input xi is one of 14 values C, N, S, L, 0, 1, 2, 3, 4, 5, 6, 7, 8, or 9. For each new input xi, the input is fed into the RNN as well as the output of the RNN for the previous input x(i−1). Thus, for an input structure token of length of 600, the LSTMs of the RNN will be traversed 600 times. Each output of the RNN 220 is based on the memory size of the LSTMs, e.g., a vector of 256 dimensions in the depicted example. The actual final output for a given complete input structure token is the output of the RNN on the last input character, which is again a vector of 256 dimensions in the depicted example.

Thus, the machine learning model 220 operates on the structure token 215 to generate a vector output of a size corresponding to the size of the LSTM cell, e.g., 256 bits, but it could be larger or smaller. A larger size is more powerful but takes longer to train. Essentially, during training of the machine learning model 220, the LSTM cells 222 learn relationships between, and patterns of, the various content elements of a structure token that are representative of a phishing exfiltration communication. That is, using a supervised machine learning operation, the operational parameters of the various LSTM cells, e.g., weights of nodes and the like, are modified in an iterative manner to improve the prediction generated by the binary classifier 240 such that it generates a correct classification of the input communication with a predetermined level of error or less (loss). The binary classifier 240 and the machine learning model 220 may be trained together as a single model such that the error in the final output generated by the binary classifier 240 is the driving factor for the machine learning training, with backpropagation of the error being used to modify operation parameters of one or both of the operational parameters of the machine learning model, e.g., RNN, 220 and binary classifier 240.

Thus, essentially, the machine learning model 220, in combination with the binary classifier 240, is trained to recognize patterns in the structure token and determine a probability that the input communication is a phishing exfiltration communication by using a machine learning feedback or backpropagation that indicates whether or not the machine learning model 220 and binary classifier 240 generated a correct classification. If an incorrect classification is generated, then the feedback causes the machine learning model 220 and binary classifier 240 to modify their operational parameters to minimize the loss or error in the probability generated by the binary classifier 240. This process is done iteratively until the loss or error is equal to or less than a predetermined level of loss/error at which point the machine learning model 220 and binary classifier 240 are determined to have converged or been trained. At this point, based on the combination of operational parameters set for each of the LSTM cells in the machine learning model 220 and operational parameters of the binary classifier 240, the machine learning model 220 and binary classifier 240 have learned what relationships and patterns of elements, e.g., recognized phishing exfiltration communication grammars, in the structure token are representative of phishing exfiltration communications.

The machine learning model 220, in the depicted example, being a bidirectional LSTM based RNN, generates two output vectors, each comprising a plurality of vector slots representing different values indicative of the presence of patterns within the structure token 215. In one illustrative embodiment, the output vectors comprise one for the forward direction LSTM path (LSTM output) and another for the reverse direction LSTM path (LSTM reversed output). Each of these vectors, in one implementation, is 256 dimensions in size as noted above. The output(s) of the machine learning model 220 are provided to the concatenation logic 230 which concatenates the vectors together and with the content features 217 extracted from the input communication by the preprocessor 210.

Figures 3, 4:
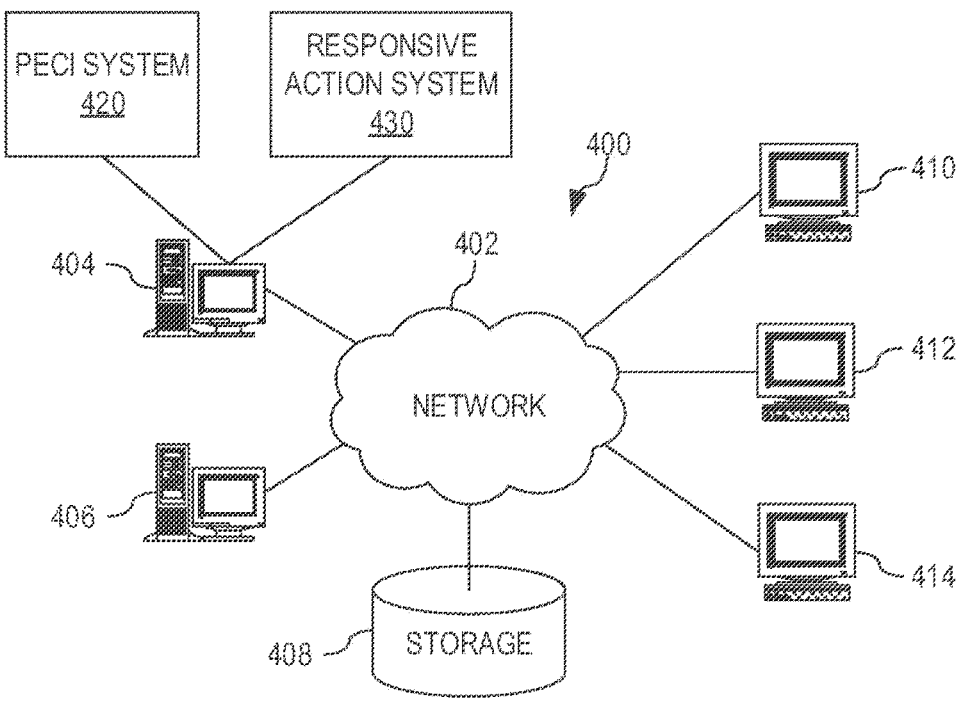
FIG. 3 is an example of a regular (normal) communication that, based on identified phishing exfiltration communication grammars, may be considered substantially similar to a phishing exfiltration communication.
FIG. 4 is an example diagram of a distributed data processing system in which aspects of the illustrative embodiments may be implemented.

The content features 217 comprise one or more content feature metrics used to improve the performance of the PECI engine 200. That is, although in most cases the structure token of a phishing exfiltration communication is different from regular (normal) communications, it is possible that there may be several false positives whose structure tokens are similar to phishing exfiltration communications. For example, FIG. 3 is an example of a normal communication that, based on identified phishing exfiltration communication grammars, may be considered substantially similar to a phishing exfiltration communication. As can be seen in FIG. 3, the calendar reminder email communication uses a structure similar to phishing exfiltration emails which also include a header, field names and separators, and the like, which may cause the machine learning model 220 and classifier 240 to mis-classify the calendar reminder email as a phishing exfiltration email. To reduce such false positives, the content feature metrics of the content features 217 may be used to distinguish false positives from actual phishing exfiltration communications.

The content feature metrics 217 may take many different forms, any of which are considered to be within the spirit and scope of the present invention. In some illustrative embodiments, the content feature metrics 217 are statistical measures of the content of the input communication that may assist in distinguishing false positives or false negatives in the classification of the input communication with regard to whether or not the input communication is a phishing exfiltration communication. Examples of content feature metrics which may be generated by the preprocessor 210 based on the content of the input communication include a content entropy metric and a text proportion metric. The content entropy metric is a metric which measure the uncertainty of a piece of information produced by a data source, where the entropy increases as the variety of symbols used on the content increases, e.g., the entropy of the string "aaa" is 0 while the entropy of "abc" is 1.58. The higher the value of the entropy, the more disordered or uncertainty there is in the string that is generated. The concept of entropy in information theory is generally known with an example formulation of entropy in information theory being available on the Wikipedia website.

As mentioned above, entropy has a tendency to generate greater entropy metric values for strings that use a large variety of symbols. In order to alleviate this tendency in the mechanisms of the illustrative embodiments, the initial entropy metric value is normalized by a logarithm of the number of symbols used in the string. In one illustrative embodiment, the entropy metric value is divided by the logarithm of the number of symbols in the string. For example, the preprocessor 210 may first convert the content of the input communication to lower case letters and digits and then the normalized content entropy is calculated for the preprocessed content.

The resulting normalized content entropy provides another indicator as to whether or not the input communication is likely a phishing exfiltration communication or not since regular (normal) communications are mainly composed of words (e.g., English words), whereas phishing exfiltration communications are composed of stolen PI with higher uncertainty, such as a username and password which often have non-word based combinations of characters/numbers and special characters. Moreover, phishing exfiltration communications have much more structural special characters (non-alphabetic or numerical characters) in order to facilitate automated extraction of PI from the content of the phishing exfiltration communications. As a result, phishing exfiltration communications yield higher entropy than regular (normal) communications. Hence, if the content entropy metric is relatively high, the input communication is more likely to be a phishing exfiltration communication. Threshold levels of content entropy metrics may be learned through the machine learning operations performed to train the binary classifier 240.

The text proportion metric is based on the observation that phishing exfiltration communications use more non-numeric and non-letter symbols. As a result, in phishing exfiltration communications, numbers and letters account for a lower percentage of the content of the phishing exfiltration communications. Hence, a text proportion metric is defined and generated by the preprocessor 210 such that the text proportion metric measures, for a given input communication, the percentage of alphanumeric characters in the metric relative the entirety of the content of the input communication. Higher text proportion metric values are more indicative or regular (normal) communications whereas relatively lower text proportion metric values are more indicative of phishing exfiltration communications. Again, threshold values for the text proportion metric may be machine learned through a machine learning operation performed with regard to the binary classifier 240.

It should be appreciated that in some illustrative embodiments, other content features may be used in addition to, or in replacement of, those content features mentioned above without departing from the spirit and scope of the illustrative embodiments. In some embodiments, the content features may not necessarily be statistical measures but may be other content features known to have high correlations with phishing exfiltration communications, such as suspicious header content, suspicious greetings, particular keywords, etc. Thus, during parsing and processing of the content of the input communication by the preprocessor 210, of these known highly correlated content features are present in the input communication, a content feature value may be set, e.g., 0 if not present, 1 if present, and output by the preprocessor 210 to the concatenation logic 230.

The concatenation logic 230 operates to concatenate the vector(s) output by the machine learning model 220 with the content features extracted by the preprocessor 210 to generate a single vector input to the binary classifier 240. In one illustrative embodiment, the output vector(s) of the machine learning model 220 comprise vectors with 256 dimensions each. The vector representation of the content features comprise a single dimension for content entropy and a single dimension for text proportion, for example, however it should be appreciated that depending on the particular content features and content feature metrics generated by the preprocessor 210, the content feature vector(s) may comprise more than one dimension. Hence, in an example implementation, the single vector output generated by the concatenation logic 230 may comprise a 514 dimension vector (256 dimensions for LSTM output, 256 dimensions for LSTM reversed output, 1 dimension for content entropy, and 1 dimension for text proportion).

The single vector output generated by the concatenation logic 230 is input to the binary classifier 240 which operates on the single vector output to generate a single output probability value, or prediction, 242 indicating a probability that the input communication is a phishing exfiltration communication or not. Alternatively, rather than a probability value, a single binary value may be output indicating a final determination as to whether the input communication is or is not a phishing exfiltration communication, e.g., 1 if it is a phishing exfiltration communication or 0 if it is not. In the case of a probability value output, the probability value may be compared to a threshold probability to determine whether to classify the input communication as a phishing exfiltration communication or not, e.g., if the probability is equal to or greater than a predetermined threshold, then the input communication is classified as a phishing exfiltration communication.

The binary classifier 240 may be implemented as any type of known or later developed binary classifier model, such as a decision tree model, Random Forest model, SVM, neural network, or the like. In some illustrative embodiments, the binary classifier 240 implements a sigmoid function to yield a final prediction as to whether or not the input communication is a phishing exfiltration communication based on the vector output(s) generated by the machine learning model 220 and the content features generated by the preprocessor 210. The sigmoid function may be trained using a binary cross entropy loss function, for example.

The output 242 of the binary classifier 240 is provided to the responsive action computing system 250 which operates on the output to perform a responsive action when it is determined that the input communication is properly classified as a phishing exfiltration communication. The responsive action system 250 may take many different forms depending on the desired responsive action to be performed. For example, the responsive action system 250 may be a computing system configured to perform intrusion detection and/or intrusion prevention operations, such as a Security Incident and Event Monitoring (STEM) computing system, for an organization, such as QRadar™ available from International Business Machines (IBM) Corporation of Armonk, New York. In other illustrative embodiments, the responsive action system 250 may be a service provider computing system such as a service provider that provides the underlying computing infrastructure to facilitate electronic communications, e.g., an electronic mail service provider, an instant messaging service provider, an Internet service provider, or the like. In some cases, the responsive action system 250 may be a notification computing system that sends out automatically generated notifications to end users' client computing devices in response to detecting that the end user was the target of a phishing attack using the mechanisms of the illustrative embodiments.

In some illustrative embodiments, in response to classifying the input communication as a phishing exfiltration communication, the output 242 from the binary classifier 240 may be provided to the responsive action system 250 along with the input communication, or certain features of the input communication extracted from it by the preprocessor 210 or other logic of the PECI engine 200. For example, if the input communication is classified as a phishing exfiltration communication, the source address, destination address, identifier of the domain and/or URL of the website used to collect personal information, the personal information collected in the phishing exfiltration communication, and the like, may be extracted from the input communication and provided to the responsive action system 250 or may be extracted by the responsive action system 250 from the forwarded input communication. This information may be used by the responsive action system 250 as a basis for automatically or semi-automatically performing one or more responsive actions.

The responsive action system 250 may perform a variety of different responsive actions based on the desired implementation. For example, in one illustrative embodiment, the responsive action system 250 may operate to block the input communication from reaching its destination in response to detecting that the input communication is a phishing exfiltration communication. In some illustrative embodiments, the source of the input communication may be identified from the input communication content/metadata and used to report the source to an appropriate authority, e.g., domain name server provider, or the like. In some implementations, such as where the PECI engine 200 is implemented by a communication service provider, such as an electronic mail service provide or the like, all communications from the sender may be blocked or redirected so that they are not able to be received at the collection point computing system. In still other illustrative embodiments, the responsive action system 250 may report the phishing attack to a domain name service provider or other authority which may suspend the domain name associated with the source of the communication, e.g., the website used to perform the phishing attack, and thereby prevent entities from accessing the website to provide their personal information. Various types of responsive actions may be performed to thwart the phishing attack and/or report the phishing attack for further action. In some cases, the responsive actions may be performed automatically to block the phishing attack and/or eliminate the ability for entities to access the website used to collect personal information.

Figure 5:
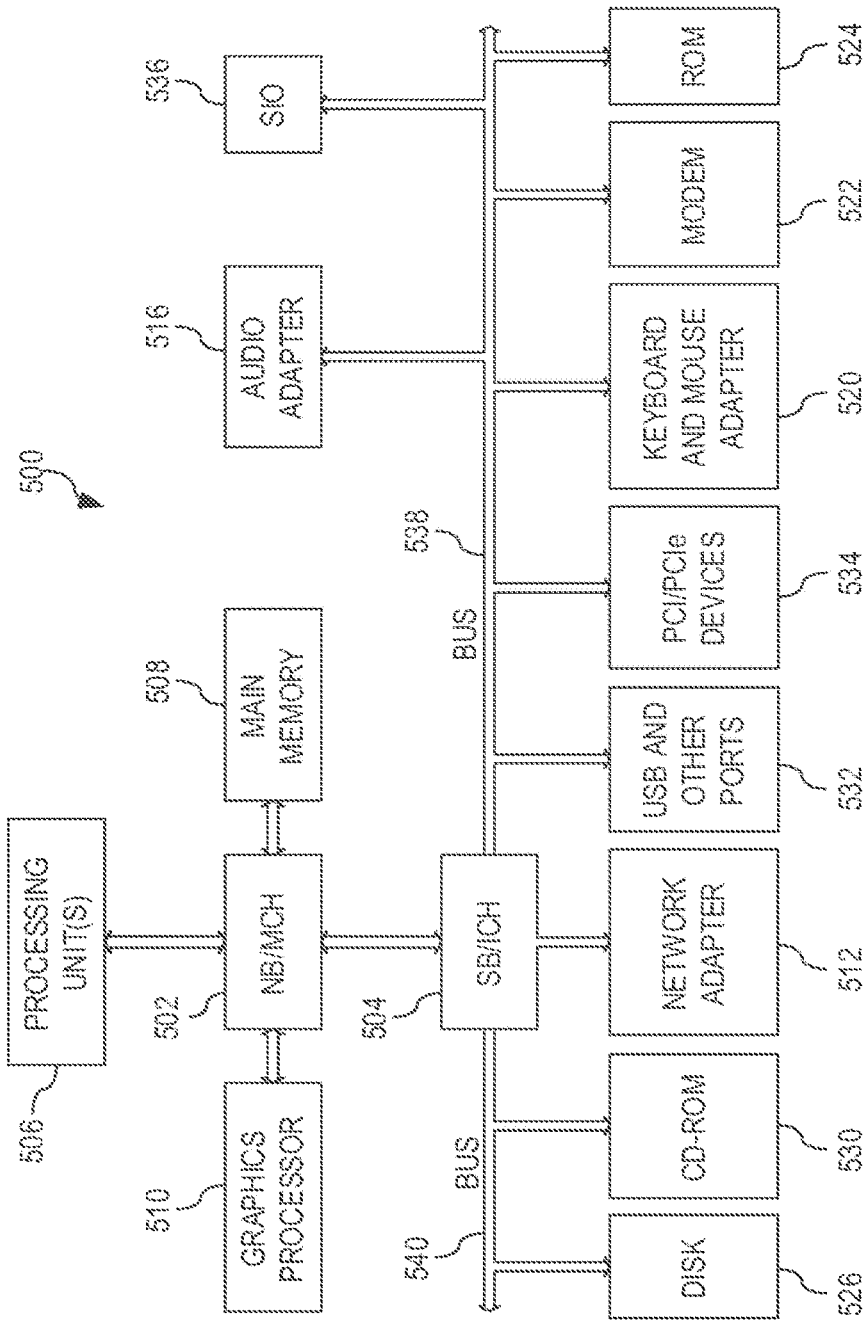
FIG. 5 is an example block diagram of a computing device in which aspects of the illustrative embodiments may be implemented.

As is apparent from the above description, the illustrative embodiments may be utilized in many different types of data processing environments. FIGS. 4 and 5 are provided hereafter as example environments in which aspects of the illustrative embodiments may be implemented. It should be appreciated that FIGS. 4 and 5 are only examples and are not intended to assert or imply any limitation with regard to the environments in which aspects or embodiments of the present invention may be implemented. Many modifications to the depicted environments may be made without departing from the spirit and scope of the present invention.

FIG. 4 depicts a pictorial representation of an example distributed data processing system in which aspects of the illustrative embodiments may be implemented. Distributed data processing system 400 may include a network of computers in which aspects of the illustrative embodiments may be implemented. The distributed data processing system 400 contains at least one network 402, which is the medium used to provide communication links between various devices and computers connected together within distributed data processing system 400. The network 402 may include connections, such as wire, wireless communication links, or fiber optic cables.

In the depicted example, server 404 and server 406 are connected to network 402 along with storage unit 408. In addition, clients 410, 412, and 414 are also connected to network 402. These clients 410, 412, and 414 may be, for example, personal computers, network computers, or the like. In the depicted example, server 404 provides data, such as boot files, operating system images, and applications to the clients 410, 412, and 414. Clients 410, 412, and 414 are clients to server 404 in the depicted example. Distributed data processing system 400 may include additional servers, clients, and other devices not shown.

In the depicted example, distributed data processing system 400 is the Internet with network 402 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 400 may also be implemented to include a number of different types of networks, such as for example, an intranet, a local area network (LAN), a wide area network (WAN), or the like. As stated above, FIG. 4 is intended as an example, not as an architectural limitation for different embodiments of the present invention, and therefore, the particular elements shown in FIG. 4 should not be considered limiting with regard to the environments in which the illustrative embodiments of the present invention may be implemented.

As shown in FIG. 4, one or more of the computing devices, e.g., server 404, may be specifically configured to implement a PECI system 420 and/or responsive action system 430 in accordance with one or more illustrative embodiments. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 404, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described herein, the implementation of the mechanisms of the illustrative embodiments improves the functionality of the computing device and provides a useful and concrete result that facilitates the identification of phishing exfiltration communications and performance of responsive actions to minimize the success of phishing attacks and phishing campaigns by reducing the ability of attackers to collect personal information from target entities.

With regard to FIG. 4, it should be appreciated that the server, e.g., server 404, that implements the PECI system 420 and/or responsive action system 430 may be a intrusion detection system/intrusion prevention system (IDS/IPS), a SIEM system, an electronic communication service provider server system, a server associated with an organization that may be targeted by phishing attacks, or the like. Moreover, in some illustrative embodiments, the PECI system 420 and/or responsive action system 430 may be implemented on the client workstations themselves, e.g., 410-414. It should further be appreciated that the PECI system 420 and/or responsive action system 430 may be distributed across multiple computing devices, e.g., multiple server computing devices, such as in a cloud computing environment or the like, and the PECI system 420 and/or responsive action system 430 may be on different computing systems, potentially associated with different organizations (e.g., a first organization being responsible for detecting phishing exfiltration communications and a second organization being responsible for performing responsive actions to mitigate the negative effects of the phishing exfiltration communications).

In an example embodiment, for purposes of illustration only, the PECI system 420 and responsive action system 430 are considered to be provided on a same server computing device 404 which itself may also be a communication service provider's server computing device 404 that is used by attackers to route phishing exfiltration communications to a collection point computing device. For example, a phishing campaign may be executed, such as in the manner described with regard to FIG. 1 above, in which the attacker may send out email communications via an email service provider using server 404. The phishing emails may emulate an authentic email from a valid entity indicating some need for the recipient to click a link or otherwise access a website to enter personal information, e.g., change a password or the like. The recipients, e.g., a user of client computing device 412, may receive the phishing email and click a link that redirects their client computing device's web browser application to a phishing website hosted on a server, such as server 406. The phishing website may emulate a legitimate website into which the user of the client computing device 412, assuming that it is a legitimate website, may enter personal information, such as user name, password, account information, etc. The phishing website may then generate a phishing exfiltration communication that is transmitted through the electronic communication service server 404 to a collection computing device, e.g., client computing device 414.

The PECI system 420 may monitor and evaluate each electronic communication flowing through the server 404. It should be appreciated that, for scalability, there may be multiple instances of PECI system 420 and/or responsive action system 430 with a routing mechanism provided to route incoming communications to appropriate ones of these instances in order to maintain service performance at an acceptable level. The PECI system 420 receives the input communication and operates on it in the manner described previously with reference to FIG. 2, to determine whether the input communication is a phishing exfiltration communication or not. If the input communication is a phishing exfiltration communication, then the responsive action system 430 may automatically perform a responsive action to thwart and/or report the phishing attack. For example, the responsive action system 430 may block the phishing exfiltration communication from reaching the destination, i.e. the collection point computing system 414, and may report the phishing attack to an appropriate authority.

As noted above, the mechanisms of the illustrative embodiments utilize specifically configured computing devices, or data processing systems, to perform the operations for identifying phishing exfiltration communications and performing responsive actions when such a phishing exfiltration communication is identified. These computing devices, or data processing systems, may comprise various hardware elements which are specifically configured, either through hardware configuration, software configuration, or a combination of hardware and software configuration, to implement one or more of the systems/subsystems described herein.

FIG. 5 is a block diagram of just one example data processing system in which aspects of the illustrative embodiments may be implemented. Data processing system 500 is an example of a computer, such as server 404 in FIG. 4, in which computer usable code or instructions implementing the processes and aspects of the illustrative embodiments of the present invention may be located and/or executed so as to achieve the operation, output, and external effects of the illustrative embodiments as described herein.

In the depicted example, data processing system 500 employs a hub architecture including north bridge and memory controller hub (NB/MCH) 502 and south bridge and input/output (I/O) controller hub (SB/ICH) 504. Processing unit 506, main memory 508, and graphics processor 510 are connected to NB/MCH 502. Graphics processor 510 may be connected to NB/MCH 502 through an accelerated graphics port (AGP).

In the depicted example, local area network (LAN) adapter 512 connects to SB/ICH 504. Audio adapter 516, keyboard and mouse adapter 520, modem 522, read only memory (ROM) 524, hard disk drive (HDD) 526, CD-ROM drive 530, universal serial bus (USB) ports and other communication ports 532, and PCI/PCIe devices 534 connect to SB/ICH 504 through bus 538 and bus 540. PCI/PCIe devices may include, for example, Ethernet adapters, add-in cards, and PC cards for notebook computers. PCI uses a card bus controller, while PCIe does not. ROM 524 may be, for example, a flash basic input/output system (BIOS).

HDD 526 and CD-ROM drive 530 connect to SB/ICH 504 through bus 540. HDD 526 and CD-ROM drive 530 may use, for example, an integrated drive electronics (IDE) or serial advanced technology attachment (SATA) interface. Super I/O (SIO) device 536 may be connected to SB/ICH 504.

An operating system runs on processing unit 506. The operating system coordinates and provides control of various components within the data processing system 500 in FIG. 5. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 500.

As a server, data processing system 500 may be, for example, an IBM eServer™ System p® computer system, Power™ processor based computer system, or the like, running the Advanced Interactive Executive (AIX®) operating system or the LINUX® operating system. Data processing system 500 may be a symmetric multiprocessor (SMP) system including a plurality of processors in processing unit 506. Alternatively, a single processor system may be employed.

Instructions for the operating system, the object-oriented programming system, and applications or programs are located on storage devices, such as HDD 526, and may be loaded into main memory 508 for execution by processing unit 506. The processes for illustrative embodiments of the present invention may be performed by processing unit 506 using computer usable program code, which may be located in a memory such as, for example, main memory 508, ROM 524, or in one or more peripheral devices 526 and 530, for example.

A bus system, such as bus 538 or bus 540 as shown in FIG. 5, may be comprised of one or more buses. Of course, the bus system may be implemented using any type of communication fabric or architecture that provides for a transfer of data between different components or devices attached to the fabric or architecture. A communication unit, such as modem 522 or network adapter 512 of FIG. 5, may include one or more devices used to transmit and receive data. A memory may be, for example, main memory 508, ROM 524, or a cache such as found in NB/MCH 502 in FIG. 5.

As mentioned above, in some illustrative embodiments the mechanisms of the illustrative embodiments may be implemented as application specific hardware, firmware, or the like, application software stored in a storage device, such as HDD 526 and loaded into memory, such as main memory 508, for executed by one or more hardware processors, such as processing unit 506, or the like. As such, the computing device shown in FIG. 5 becomes specifically configured to implement the mechanisms of the illustrative embodiments and specifically configured to perform the operations and generate the outputs described herein with regard to the PECI system and/or responsive action system.

Those of ordinary skill in the art will appreciate that the hardware in FIGS. 4 and 5 may vary depending on the implementation. Other internal hardware or peripheral devices, such as flash memory, equivalent non-volatile memory, or optical disk drives and the like, may be used in addition to or in place of the hardware depicted in FIGS. 4 and 5. Also, the processes of the illustrative embodiments may be applied to a multiprocessor data processing system, other than the SMP system mentioned previously, without departing from the spirit and scope of the present invention.

Moreover, the data processing system 500 may take the form of any of a number of different data processing systems including client computing devices, server computing devices, a tablet computer, laptop computer, telephone or other communication device, a personal digital assistant (PDA), or the like. In some illustrative examples, data processing system 500 may be a portable computing device that is configured with flash memory to provide non-volatile memory for storing operating system files and/or user-generated data, for example. Essentially, data processing system 500 may be any known or later developed data processing system without architectural limitation.

Figure 6:
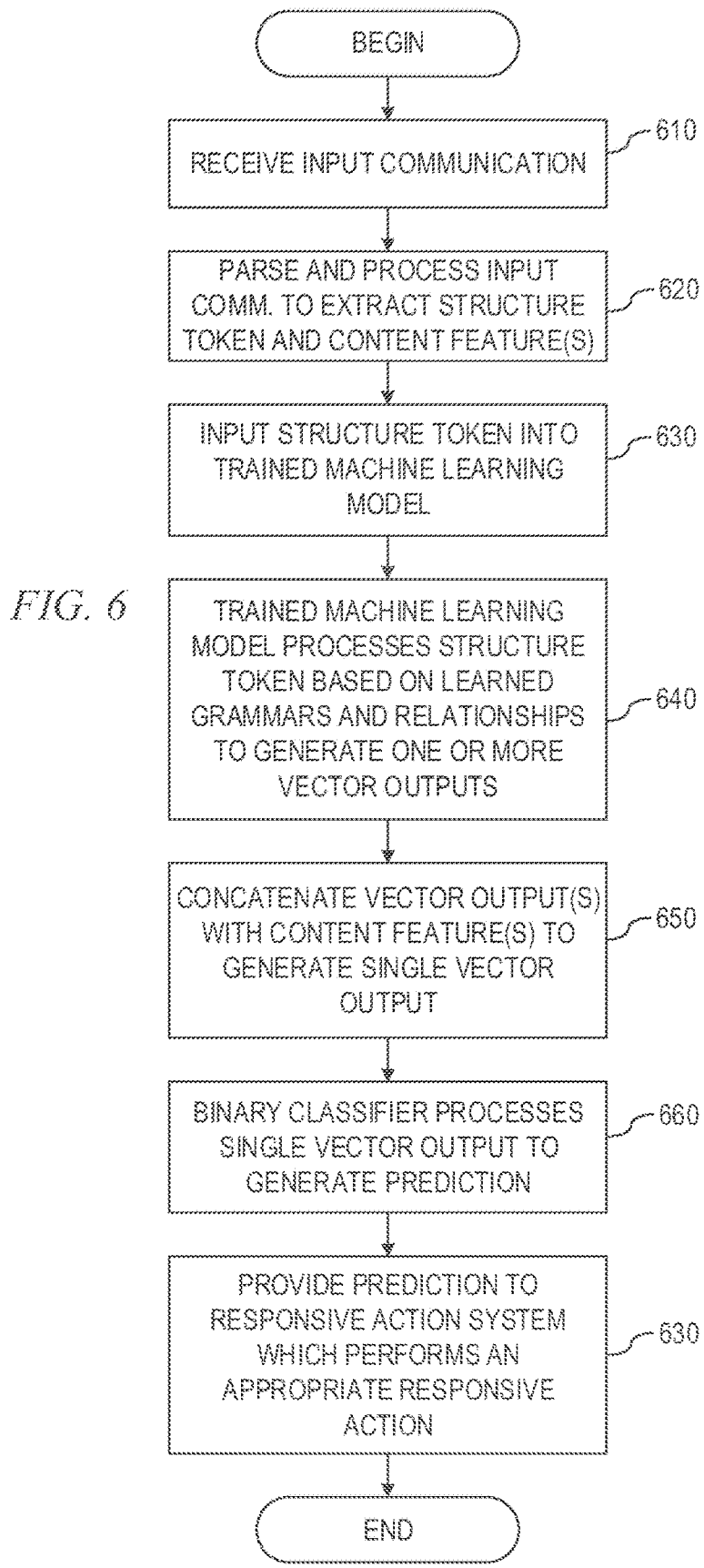
FIG. 6 is a flowchart outlining an example operation of a phishing exfiltration communication identification (PECI) system when performing identification of phishing exfiltration communications in accordance with one illustrative embodiment.

FIG. 6 is a flowchart outlining an example operation of a PECI system when performing identification of phishing exfiltration communications in accordance with one illustrative embodiment. As shown in FIG. 6, the operation starts by the PECI system receiving an input communication (step 610). The input communication is parsed and processed by the preprocessor of the PECI system to extract a structure token and, in some illustrative embodiments, one or more content features (step 620). The structure token is input to the trained machine learning model (step 630). The trained machine learning model processes the structure token based on learned phishing exfiltration communication grammars and their relationships, and generates one or more vector outputs (step 640). The one or more vector outputs generated by the trained machine learning model are concatenated with the one or more content features to generate a single vector output (step 650). The single vector output is input to a binary classifier of the PECI system which operates on the single vector output to generate a prediction of whether or not the input communication is a phishing exfiltration communication (step 660). The prediction is input to a responsive action computing system which operates on the prediction to perform a responsive action (step 670). The operation then terminates.

Thus, the illustrative embodiments provide an improved computing tool that provides new functionality not previously present in computing systems for automatically identifying phishing exfiltration communications and performing automated responsive actions when such phishing exfiltration communications are identified. The illustrative embodiments employ computer based machine learning and artificial intelligence to evaluate the structure and content of electronic communications to determine whether the structure and content is indicative of a phishing exfiltration communication. Machine learning models are trained to recognize structural patterns based on identified phishing exfiltration communication grammars. Moreover, machine learning models are trained to evaluate such structural patterns along with content features, such as content entropy and text proportion, to determine a probability that an input communication is a phishing exfiltration communication. Based on such probabilities, a final classification of an input communication is made as to whether or not it is a phishing exfiltration communication which is then input to a responsive action system that automatically performs a responsive action to thwart and/or report the phishing attack.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

processing an electronic communication, received from a data network, to produce a structure token, wherein the structure token comprises a class designator and a numeric value, the class designator indicating a classification of a type of content present in a corresponding portion of text of the electronic communication, and the numeric value indicating a number of consecutive characters corresponding to the type of content;

processing the structure token by a machine learning model, wherein the machine learning model is trained to identify content that is generated in response to one or more phishing attacks; and producing, by a processor using the machine learning model, a classification output indicating whether the electronic communication comprises content that was generated in response to the one or more phishing attacks.

2. The method of claim 1, further comprising:

extracting one or more content feature metrics from the electronic communication, wherein the one or more content feature metrics are statistical measures of content of the electronic communication that assist in distinguishing false positives or false negatives in the classification output.

3. The method of claim 2, further comprising:

generating, by the machine learning model in response to the processing of the structure token, at least one first vector output indicating computed values;

concatenating the at least one first vector output with the one or more content feature metrics to generate a second output vector; and determining the classification output based on the second output vector.

4. The method of claim 3, wherein the at least one first vector output comprises one first vector output corresponding to a forward propagation set of Long Short Term Memory (LSTM) cells in the machine learning model, the method further comprising:

generating a second first vector output corresponding to a reverse propagation set of LSTM cells in the machine learning model; and generating the second output vector by concatenating the one first vector output, the second first vector output, and the one or more content feature metrics.

5. The method of claim 1, wherein the classification output comprises a probability value, the method further comprising:

blocking the electronic communication from reaching a destination of the electronic communication in response to comparing the probability value with a predetermined threshold.

6. The method of claim 1, wherein the electronic communication comprises a collection of personal information about one or more targeted entities, wherein the personal information was collected in response to the one or more phishing attacks occurring at the one or more targeted entities.

7. A system comprising:
a processor; and
a memory to store instructions that, when executed by the processor cause the processor to:
process an electronic communication, received from a data network, to produce a structure token, wherein the structure token comprises a class designator and a numeric value, the class designator indicating a classification of a type of content present in a corresponding portion of text of the electronic communication, and the numeric value indicating a number of consecutive characters corresponding to the type of content;
process the structure token by a machine learning model, wherein the machine learning model is trained to identify content that is generated in response to one or more phishing attacks; and
produce, by the machine learning model, a classification output indicating whether the electronic communication comprises content that was generated in response to the one or more phishing attacks.

8. The system of claim 7, wherein the processor, responsive to executing the instructions, further causes the system to:
extract one or more content feature metrics from the electronic communication, wherein the one or more content feature metrics are statistical measures of content of the electronic communication that assist in distinguishing false positives or false negatives in the classification output.

9. The system of claim 8, wherein the processor, responsive to executing the instructions, further causes the system to:
generate, by the machine learning model in response to the processing of the structure token, at least one first vector output indicating computed values;
concatenate the at least one first vector output with the one or more content feature metrics to generate a second output vector; and
determine the classification output based on the second output vector.

10. The system of claim 9, wherein the at least one first vector output comprises one first vector output corresponding to a forward propagation set of Long Short Term Memory (LSTM) cells in the machine learning model, and wherein the processor, responsive to executing the instructions, further causes the system to:
generate a second first vector output corresponding to a reverse propagation set of LSTM cells in the machine learning model; and
generate the second output vector by concatenating the one first vector output, the second first vector output, and the one or more content feature metrics.

11. The system of claim 7, wherein the classification output comprises a probability value, and wherein the processor, responsive to executing the instructions, further causes the system to:
block the electronic communication from reaching a destination of the electronic communication in response to comparing the probability value with a predetermined threshold.

12. The system of claim 7, wherein the electronic communication comprises a collection of personal information about one or more targeted entities, wherein the personal information was collected in response to the one or more phishing attacks occurring at the one or more targeted entities.

13. A non-transitory computer readable storage medium, having instructions stored thereon which, when executed by a processor, cause the processor to:
process an electronic communication, received from a data network, to produce a structure token, wherein the structure token comprises a class designator and a numeric value, the class designator indicating a classification of a type of content present in a corresponding portion of text of the electronic communication, and the numeric value indicating a number of consecutive characters corresponding to the type of content;
process the structure token by a machine learning model, wherein the machine learning model is trained to identify content that is generated in response to one or more phishing attacks; and
produce, by the machine learning model, a classification output indicating whether the electronic communication comprises content that was generated in response to the one or more phishing attacks.

14. The non-transitory computer readable storage medium of claim 13, wherein the processor is to:
extract one or more content feature metrics from the electronic communication, wherein the one or more content feature metrics are statistical measures of content of the electronic communication that assist in distinguishing false positives or false negatives in the classification output.

15. The non-transitory computer readable storage medium of claim 14, wherein the processor is to:
generate, by the machine learning model in response to the processing of the structure token, at least one first vector output indicating computed values;
concatenate the at least one first vector output with the one or more content feature metrics to generate a second output vector; and
determine the classification output based on the second output vector.

16. The non-transitory computer readable storage medium of claim 15, wherein the at least one first vector output comprises one first vector output corresponding to a forward propagation set of Long Short Term Memory (LSTM) cells in the machine learning model, and wherein the processor is to:
generate a second first vector output corresponding to a reverse propagation set of LSTM cells in the machine learning model; and
generate the second output vector by concatenating the one first vector output, the second first vector output, and the one or more content feature metrics.

17. The non-transitory computer readable storage medium of claim 13, wherein the classification output comprises a probability value, and wherein the processor is to:
block the electronic communication from reaching a destination of the electronic communication in response to comparing the probability value with a predetermined threshold.

\* \* \* \* \*